United States Patent
Liu et al.

(10) Patent No.: US 9,014,698 B2
(45) Date of Patent: Apr. 21, 2015

(54) SYSTEMS AND METHODS FOR PERFORMING HANDOVER CANCELLATION

(75) Inventors: Chunmei Liu, Great Falls, VA (US); Masoud Olfat, Great Falls, VA (US)

(73) Assignee: Clearwire IP Holdings LLC, Bellvue, WA (US)

( * ) Notice: Subject to any disclaimer, the term of this patent is extended or adjusted under 35 U.S.C. 154(b) by 522 days.

(21) Appl. No.: 13/047,464

(22) Filed: Mar. 14, 2011

(65) Prior Publication Data

US 2012/0238315 A1    Sep. 20, 2012

(51) Int. Cl.
*H04W 36/00* (2009.01)
*H04W 56/00* (2009.01)

(52) U.S. Cl.
CPC ...... *H04W 36/0055* (2013.01); *H04W 56/0045* (2013.01)

(58) Field of Classification Search
USPC .................. 455/436, 438, 525, 452.1, 452.2; 370/331, 329
See application file for complete search history.

(56) References Cited

U.S. PATENT DOCUMENTS

| | | | |
|---|---|---|---|
| 2008/0188225 A1* | 8/2008 | Park et al. | 455/438 |
| 2009/0109923 A1* | 4/2009 | Kojima | 370/331 |
| 2009/0176494 A1* | 7/2009 | Lee et al. | 455/436 |
| 2011/0013717 A1* | 1/2011 | Josiam et al. | 375/295 |

OTHER PUBLICATIONS

"Part 16: Air Interface for Fixed and Mobile Broadband Wireless Access Systems", Draft Amendment to IEEE Standard for Local and metropolitan area networks, IEEE P802.16MID5, Apr. 2010.*
"Part 16: Air Interface for Fixed and Mobile Broadband Wireless Access Systems", Draft Amendment to IEEE Standard for Local and metropolitan area networks, IEEE P802.16M/D5, Apr. 2010.

* cited by examiner

*Primary Examiner* — Patrick Edouard
*Assistant Examiner* — Chuck Huynh

(57) ABSTRACT

Systems and methods for performing handover cancellation in a wireless communication system are provided. According to an aspect of the invention, a mobile station requests bandwidth from a serving base station for the mobile station to send a handover cancellation request message to the serving base station. The mobile station then receives an allocation of the requested bandwidth from the serving base station, and sends the handover cancellation request message to the serving base station via the allocated bandwidth. The mobile station requests the bandwidth after a disconnect time and before a resource retain time.

9 Claims, 3 Drawing Sheets

SYSTEMS AND METHODS FOR PERFORMING HANDOVER CANCELLATION

BACKGROUND OF THE INVENTION

The present invention relates to performing handover cancellation in a wireless communication system.

In a wireless communication system, a mobile station may request or be instructed to handover from a serving base station to a target base station, such as when the mobile station changes location, the signal quality of the serving base station degrades, etc. After initiating the handover procedure, it may be necessary for the mobile station to cancel the handover for various reasons. For example, the target base station may not reachable when the mobile station needs to complete the handover, the target base station may not have sufficient resources to allocate to the mobile station, etc.

SUMMARY OF THE INVENTION

Systems and methods consistent with the present invention perform handover cancellation in wireless networks. According to an aspect of the invention, a mobile station requests bandwidth from a serving base station for the mobile station to send a handover cancellation request message to the serving base station. The mobile station then receives an allocation of the requested bandwidth from the serving base station, and sends the handover cancellation request message to the serving base station via the allocated bandwidth. The mobile station may request the bandwidth after a disconnect time and before a resource retain time.

The mobile station may be prevented from requesting bandwidth from the serving base station for transport flows after the disconnect time. The mobile station may request the bandwidth by sending a bandwidth request preamble sequence and a quick access message to the serving base station over a bandwidth request channel that is different from a channel over which the mobile station sends the handover cancellation request message to the serving base station. If the serving base station is unable to decode the quick access message, the mobile station may receive a grant for a standalone bandwidth request header from the serving base station over the bandwidth request channel, and send the standalone bandwidth request header to the serving base station over the bandwidth request channel.

An HO_Reentry_Mode may be set to zero, and the disconnect time may equal an Action_Time minus a Disconnect_Time_Offset. Alternatively, the HO_Reentry_Mode may be set to one, and the disconnect time may equal the Action_Time plus the Disconnect_Time_Offset.

According to another aspect of the invention, a serving base station station receives a request for bandwidth from a mobile station for the mobile station to send a handover cancellation request message to the serving base station. The serving base station allocates the requested bandwidth to the mobile station, and receives the handover cancellation request message from the mobile station via the allocated bandwidth. The serving base station receives the request for the bandwidth after a disconnect time and before a resource retain time.

The serving base station may be prevented from providing bandwidth for transport flows after the disconnect time. The serving base station may receive the request for bandwidth that includes a preamble sequence and a quick access message over a bandwidth request channel that is different from a channel over which the serving base station receives the handover cancellation request message from the mobile station. If the serving base station is unable to decode the quick access message, the serving base station may send a grant for a standalone bandwidth request header to the mobile station over the bandwidth request channel, and receive the standalone bandwidth request header from the mobile station over the bandwidth request channel. The serving base station may discard packets of transport flows received from the mobile station after the disconnect time.

The HO_Reentry_Mode may be set to zero, and the disconnect time may equal the Action_Time minus the Disconnect_Time_Offset. Alternatively, the HO_Reentry_Mode may be set to one, and the disconnect time may equal the Action_Time plus the Disconnect_Time_Offset.

Other objects, advantages, and novel features of the present invention will become apparent from the following detailed description of the invention when considered in conjunction with the accompanying drawings.

DETAILED DESCRIPTION OF EXEMPLARY EMBODIMENTS

Handover cancellation can cause problems in certain networks. For example, in networks requiring that handover cancellation is performed using user data traffic channels, the mobile station may not be able to send a handover cancellation message to the previous serving base station, due to the cancellation of the bandwidth allocation for the mobile station by the previous serving base station. One such network is defined by the Institute of Electrical and Electronics Engineers (IEEE) in Part 16 of the IEEE Standard for Local and Metropolitan Area Networks (hereinafter "the 802.16m draft"), which is hereby incorporated by reference in its entirety into the present document. This standard may be applied to Worldwide Interoperability for Microwave Access (WiMAX) systems. The handover cancellation procedure defined in the 802.16m draft prior to the present invention may cause a state machine problem in the mobile station for the following reasons.

Figure 1:
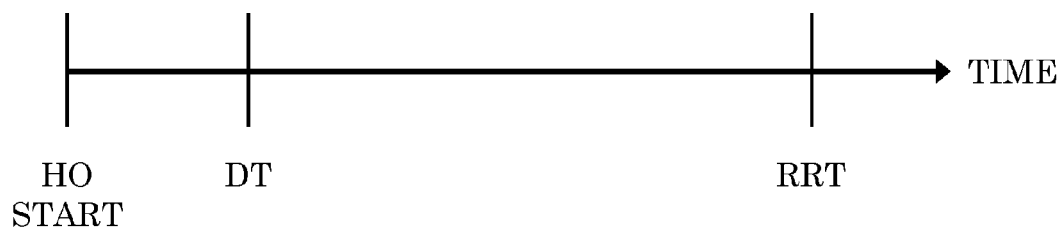
FIG. 1 shows a timeline of the handover cancellation procedure according to the 802.16m draft.

FIG. 1 shows a timeline of the handover cancellation procedure according to the 802.16m draft. The timeline is not drawn to scale. As illustrated in the timeline, at a predetermined amount of time after initiating the handover (HO START), the mobile station disconnects from the serving base station (i.e. at the disconnect time DT), and this base station retains context information for the mobile station until the expiration of the resource retain time (RRT). Prior to the present invention, the 802.16m draft specified that the mobile station may initiate handover cancellation anytime before expiration of the resource retain time RRT, but also specified that the previous serving base station stops providing bandwidth to the mobile station once the disconnect time DT has been reached. Therefore, after the disconnect time DT but before the resource retain time RRT, the mobile station cannot obtain the necessary bandwidth to send a handover cancellation message to the previous serving base station to cancel the handover.

The conflict described above may cause a problem in the mobile station's state machine. For example, the state machine allows the mobile station to request bandwidth from the previous serving base station to cancel the handover procedure until the resource retain time RRT has been reached. On the other hand, the state machine tells the mobile station that the previous serving base station will not grant bandwidth allocations to the mobile station once the disconnect time DT has been reached, so the mobile station is not allowed to request bandwidth from the previous serving base station to cancel the handover procedure once the disconnect time DT has been reached. This conflict may cause the mobile station to stop operating properly.

Exemplary embodiments of the present invention provide a method of performing handover cancellation in a wireless communication system that avoids the conflict in the 802.16m draft described above. For example, according to an exemplary embodiment of the present invention, after the disconnect time DT, the mobile station is allowed to request bandwidth for control information, such as a handover cancellation request message, from the previous serving base station. However, the mobile station is not allowed to request bandwidth for transport flows. As used in this document, "transport flows" refers to the transmission of user data, but does not include control information.

As discussed above, either the mobile station or the serving base station may initiate the handover procedure. If handover is initiated by the mobile station, an AAI_HO-REQ message is sent by the mobile station to the serving base station, and an AAI_HO-CMD message is then sent by the serving base station to the mobile station to acknowledge the AAI_HO-REQ message. If handover is initiated by the serving base station, an AAI_HO-CMD message is sent by the serving base station to the mobile station. The AAI_HO-CMD message includes the HO_Reentry_Mode, the Disconnect_Time_Offset, the Resource_Retain_Time, and the Action_Time. If the mobile station can maintain communication with the serving base station while performing network reentry with the target base station, the HO_Reentry_Mode is set to 1, and the disconnect time DT is defined as the Action_Time plus the Disconnect_Time_Offset. If the mobile station is not expected to maintain communication with the serving base station while performing network reentry with the target base station, the HO_Reentry_Mode is set to 0, and the disconnect time DT is defined as the Action_Time minus the Disconnect_Time_Offset.

The mobile station may send an AAI_HO-IND message during handover preparation, handover execution, and/or handover cancellation. The AAI_HO-IND includes an HO Event Code. The HO Event Code may indicate that the handover should be cancelled for a variety of reasons. For example, the HO Event Code may indicate that the handover should be cancelled if the mobile station does not have the latest superframe header (SFH) for any of the target base stations.

Figure 2:
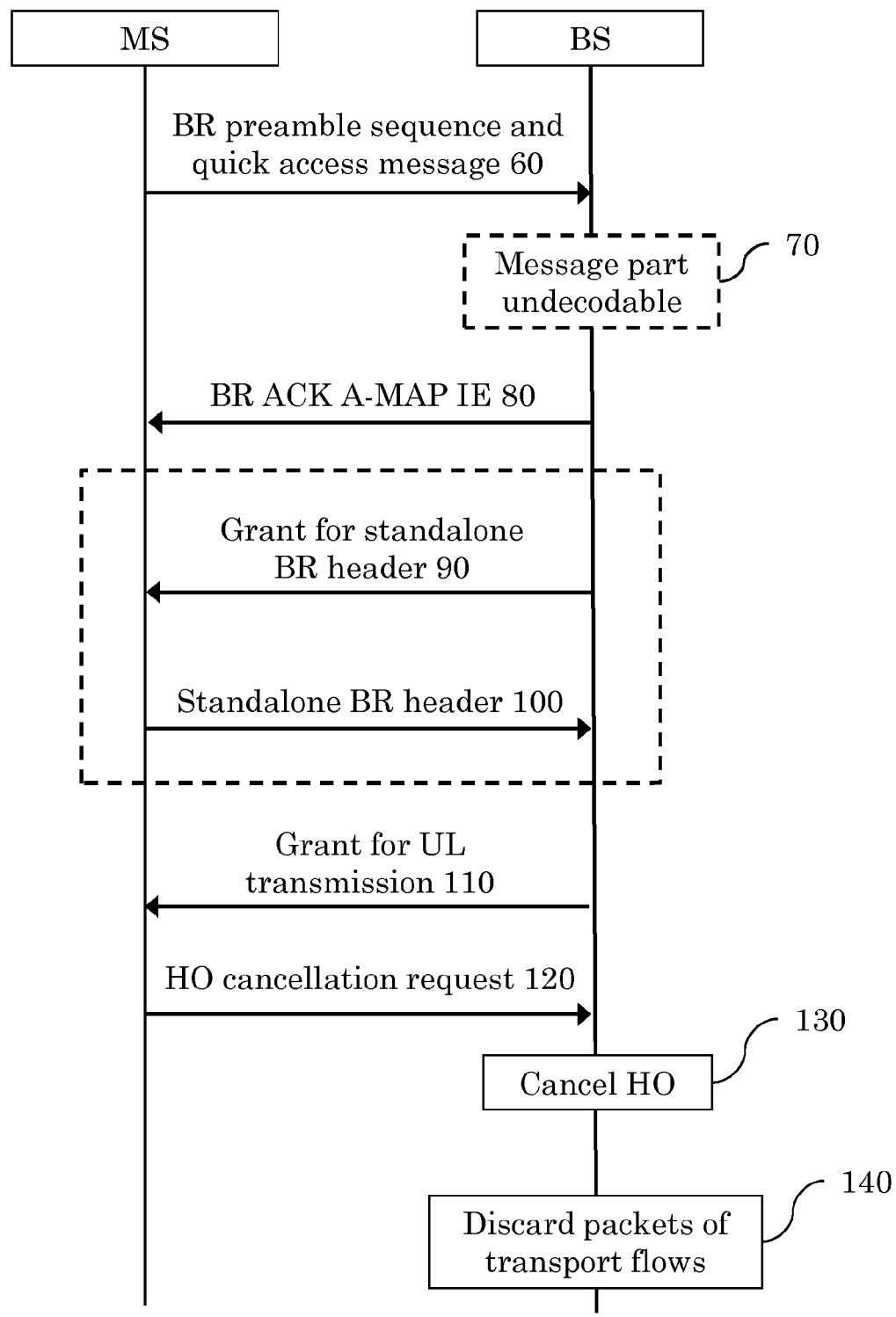
FIG. 2 shows a flow chart illustrating a handover cancellation procedure according to an exemplary embodiment of the invention.

FIG. 2 shows a flow chart illustrating a handover cancellation procedure according to an exemplary embodiment of the invention. If the HO_Reentry_Mode is set to be 0, the method shown in FIG. 2 may begin after the disconnect time DT, or after the previously serving base station receives an AAI_HO-IND message with an HO Event Code of 0b010 from the mobile station, whichever occurs first. The HO Event Code of 0b010 indicates that the previously serving base station meets the "ABS unreachable" triggers defined in the 802.16m draft, meaning that the mobile station is unable to maintain communication with the previously serving base station. If the HO_Reentry_Mode is set to be 1, the method shown in FIG. 2 may begin after the disconnect time DT, after the previously serving base station receives an AAI_HO-IND message with an HO Event Code of 0b010 from the mobile station, or after the previously serving base station receives a handover completion confirmation message from the target base station, whichever occurs first. The method shown in FIG. 2 concludes before the resource retain time RRT.

As shown in FIG. 2, in order to request an allocation of bandwidth from the previously serving base station BS, the mobile station MS sends a message 60 with a bandwidth request (BR) preamble sequence and a quick access message to the previously serving base station BS. The message 60 is sent through a randomly selected BR channel that is shared by multiple mobile stations, and that is different from the regular channel through which the mobile station MS and the previously serving base station BS normally communicate and exchange data. After receiving the message 60, the previously serving base station BS may send at least one BR ACK A-MAP IE message 80 to the mobile station MS over the BR channel. The BR ACK A-MAP IE message 80 indicates the decoding status of each BR opportunity (i.e. BR channel) in the previous frame, the correctly received BR preamble sequences in the BR opportunities of the previous uplink (UL) frame being acknowledged or granted, and the decoding status of the quick access message for each correctly received BR preamble sequence being acknowledged or granted.

If the quick access message is successfully decoded, the previously serving base station BS may immediately provide a grant for UL transmission 110 over the regular channel. However, if the previously serving base station BS is unable to decode the quick access message at 70, the previously serving base station BS provides a grant for a standalone BR header 90 over the BR channel. The mobile station MS then transmits a standalone BR header 100 over the BR channel to request the bandwidth from the previously serving base station BS.

After the mobile station MS receives the grant for UL transmission 110, the mobile station MS sends a handover cancellation request message 120 over the regular channel to the previously serving base station BS, which cancels the handover procedure at 130. The handover cancellation request message 120 may be an AAI_HO-IND message with an appropriate Event Code that indicates the reason for cancellation.

As discussed above, after the disconnect time DT, the mobile station MS is directed to request bandwidth only for sending control information and not transport flows. However, there is a possibility that the mobile station MS may erroneously send transport flows over the regular channel via the bandwidth allocated by the base station BS. Therefore, the base station BS may discard any packets of transport flows received from the mobile station MS at 140. Accordingly, any transmission of transport flows from the mobile station MS will be ineffective, and the base station BS will process only the control information sent by the mobile station MS.

Figure 3:
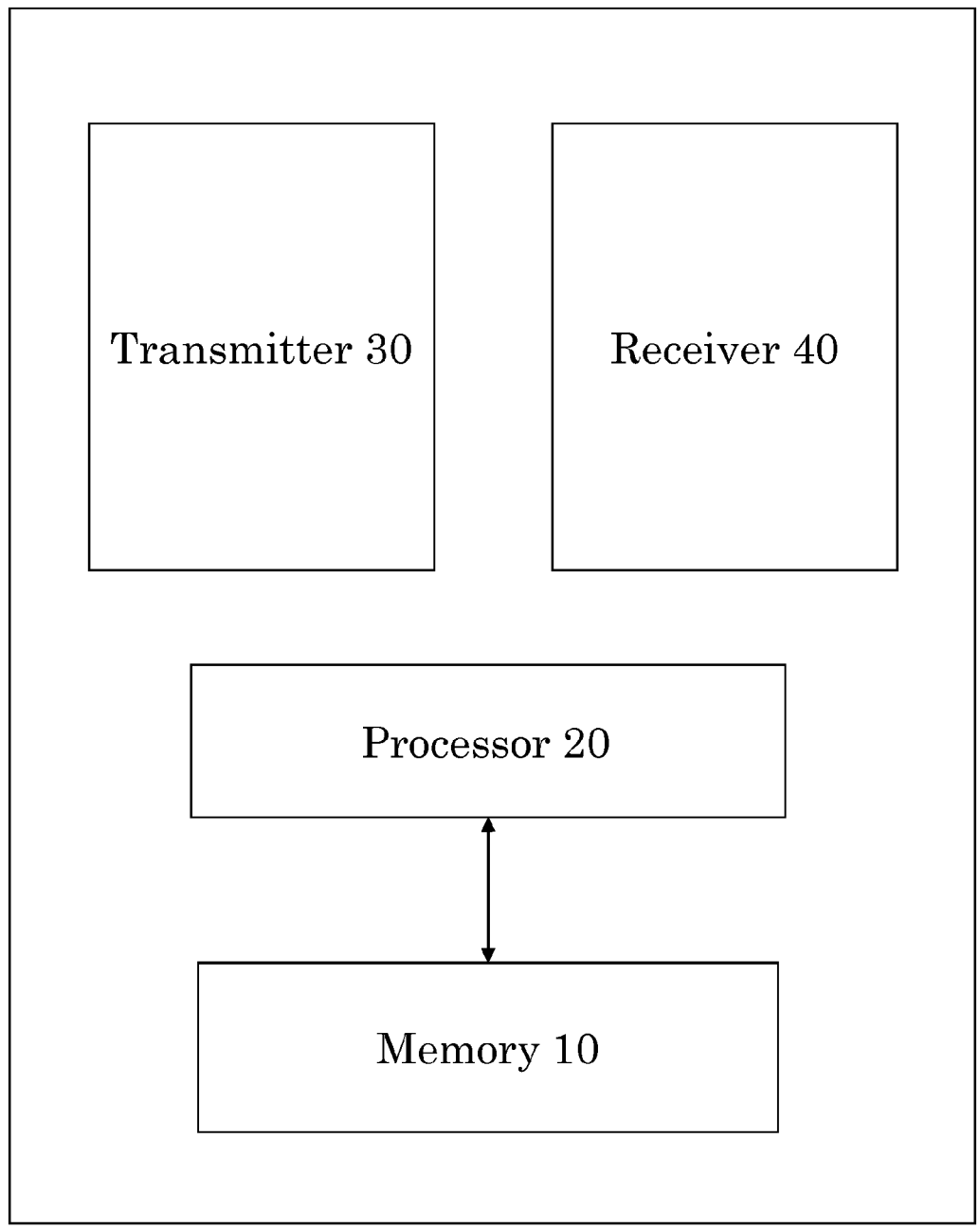
FIG. 3 shows a wireless device according to exemplary embodiments of the present invention.

FIG. 3 shows a wireless device according to exemplary embodiments of the present invention. The wireless device may be a mobile station or a base station. As shown in FIG. 3, the wireless device includes a memory 10. The memory 10 may be any electronic component capable of storing electronic information. The memory 10 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

The wireless device also includes a processor 20 coupled to the memory 10. The processor 20 may be a general purpose single- or multi-chip microprocessor, a special purpose microprocessor, a microcontroller, a programmable gate array, etc. The processor 20 may be referred to as a central processing unit (CPU). Although just a single processor 20 is shown in the wireless device of FIG. 3, in an alternative configuration, a combination of processors could be used.

Data and instructions may be stored in the memory 10. The instructions may be executable by the processor 20 to implement the methods disclosed herein. Executing the instructions may involve the use of the data that is stored in the memory 10.

The wireless device may also include a transmitter 30 and a receiver 40. The transmitter 30 may transmit signals from the wireless device to another device. The receiver 40 may receive signals from the wireless device to another device. An antenna may be electrically coupled to the transmitter 30 and/or the receiver 40. The various components of the wireless device may be coupled together by one or more buses, which may include a power bus, a control signal bus, a status signal bus, a data bus, etc.

Although exemplary embodiments have been described in connection with the IEEE 802.16m draft standard, the present invention is equally applicable to other types of networks that operate using other standards.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of cancelling a handover procedure in a wireless communication system, the method being implemented by a mobile station, the method comprising the acts of:
    requesting bandwidth from a serving base station for the mobile station to send a handover cancellation request message to the serving base station;
    receiving an allocation of the requested bandwidth from the serving base station; and
    sending the handover cancellation request message to the serving base station via the allocated bandwidth; wherein:
    the mobile station requests the bandwidth after a disconnect time and before a resource retain time expires;
    the mobile station is allowed to request bandwidth from the serving base station for control information after the disconnect time, and is prevented from requesting bandwidth from the serving base station for transport flows after the disconnect time;
    when the mobile station is not expected to maintain communication with the serving base station while performing network reentry_with a target base station, an HO_Reentry_Mode is set to zero, and the disconnect time equals an Action_Time minus a Disconnect_Time_Offset; and
    when the mobile station is expected to maintain communication with the serving base station while performing network reentry_with the target base station, the HO_Reentry Mode is set to one, and the disconnect time equals the Action_Time plus the Disconnect_Time_Offset.

2. The method according to claim 1, wherein the mobile station requests the bandwidth by sending a bandwidth request preamble sequence and a quick access message to the serving base station over a bandwidth request channel that is different from a channel over which the mobile station sends the handover cancellation request message to the serving base station.

3. The method according to claim 2, further comprising, if the serving base station is unable to decode the quick access message, the acts of:
    receiving a grant for a standalone bandwidth request header from the serving base station over the bandwidth request channel; and
    sending the standalone bandwidth request header to the serving base station over the bandwidth request channel.

4. A method of cancelling a handover procedure in a wireless communication system, the method being implemented by a serving base station, the method comprising the acts of:
    receiving a request for bandwidth from a mobile station for the mobile station to send a handover cancellation request message to the serving base station;
    allocating the requested bandwidth to the mobile station; and
    receiving the handover cancellation request message from the mobile station via the allocated bandwidth; wherein:
    the serving base station receives the request for the bandwidth after a disconnect time and before a resource retain time expires;
    the serving base station is allowed to provide bandwidth to the mobile station for control information after the disconnect time, and is prevented from providing bandwidth to the mobile station for transport flows after the disconnect time;
    when the serving base station is not expected to maintain communication with the mobile station while the mobile station performs network reentry_with a target base station, an HO Reentry_Mode is set to zero, and the disconnect time equals an Action_Time minus a Disconnect_Time_Offset; and
    when the serving base station is expected to maintain communication with the mobile station while the mobile station performs network reentry_with the target base station, the HO Reentry_Mode is set to one, and the disconnect time equals the Action_Time plus the Disconnect Time Offset.

5. The method according to claim 4, wherein the serving base station receives the request for bandwidth that includes a preamble sequence and a quick access message over a bandwidth request channel that is different from a channel over which the serving base station receives the handover cancellation request message from the mobile station.

6. The method according to claim 5, further comprising, if the serving base station is unable to decode the quick access message, the acts of:
    sending a grant for a standalone bandwidth request header to the mobile station over the bandwidth request channel; and
    receiving the standalone bandwidth request header from the mobile station over the bandwidth request channel.

7. The method according to claim 4, further comprising the act of:
    discarding packets of transport flows received from the mobile station after the disconnect time.

8. A mobile station configured for cancelling a handover procedure in a wireless communication system, the mobile station comprising:
- a processor;
- a memory coupled to the processor;
- instructions stored in the memory, the instructions being executable by the processor to:
  - request bandwidth from a serving base station for the mobile station to send a handover cancellation request message to the serving base station;
  - receive an allocation of the requested bandwidth from the serving base station; and
  - send the handover cancellation request message to the serving base station via the allocated bandwidth; wherein:
- the mobile station requests the bandwidth after a disconnect time and before a resource retain time expires;
- the mobile station is allowed to request bandwidth from the serving base station for control information after the disconnect time, and is prevented from requesting bandwidth from the serving base station for transport flows after the disconnect time;
- when the mobile station is not expected to maintain communication with the serving base station while performing network reentry with a target base station, an HO_Reentry_Mode is set to zero, and the disconnect time equals an Action_Time minus a Disconnect_Time_Offset; and
- when the mobile station is expected to maintain communication with the serving base station while performing network reentry with the target base station, the HO_Reentry_Mode is set to one, and the disconnect time equals the Action_Time plus the Disconnect_Time_Offset.

9. A serving base station configured for cancelling a handover procedure in a wireless communication system, the serving base station comprising:
- a processor;
- a memory coupled to the processor;
- instructions stored in the memory, the instructions being executable by the processor to:
  - receive a request for bandwidth from a mobile station for the mobile station to send a handover cancellation request message to the serving base station;
  - allocate the requested bandwidth to the mobile station; and
  - receive the handover cancellation request message from the mobile station via the allocated bandwidth; wherein:
- the serving base station receives the request for the bandwidth after a disconnect time and before a resource retain time expires;
- the serving base station is allowed to provide bandwidth to the mobile station for control information after the disconnect time, and is prevented from providing bandwidth to the mobile station for transport flows after the disconnect time;
- when the serving base station is not expected to maintain communication with the mobile station while the mobile station performs network reentry with a target base station, an HO_Reentrv_Mode is set to zero, and the disconnect time equals an Action_Time minus a Disconnect_Time_Offset; and
- when the serving base station is expected to maintain communication with the mobile station while the mobile station performs network reentry with the target base station, the HO_Reentry_Mode is set to one, and the disconnect time equals the Action_Time plus the Disconnect_Time_Offset.

* * * * *